United States Patent
Kammeter

[11] Patent Number: 5,206,539
[45] Date of Patent: Apr. 27, 1993

[54] TRANSFORMER WITH CANCELLATION OF HARMONIC CURRENTS BY PHASE SHITED SECONDARY WINDINGS

[75] Inventor: John B. Kammeter, Richmond, Va.

[73] Assignee: Power Distribution, Inc., Richmond, Va.

[21] Appl. No.: 792,893

[22] Filed: Nov. 15, 1991

[51] Int. Cl.$^5$ .................. H02J 3/01; H01F 33/00
[52] U.S. Cl. ............................. 307/105; 336/5
[58] Field of Search ............ 307/17, 83, 105; 336/5, 336/10, 12; 323/361, 215; 363/39; 333/177, 178, 179

[56] References Cited

U.S. PATENT DOCUMENTS

| | | | |
|---|---|---|---|
| 2,470,598 | 5/1949 | Biebesheimer | 336/12 |
| 2,482,489 | 9/1949 | Kaiser | 336/12 |
| 3,671,901 | 6/1972 | Lys | 336/5 |
| 4,513,240 | 4/1985 | Putman | 323/210 |
| 4,513,243 | 4/1985 | Novak et al. | 323/361 |
| 4,779,181 | 10/1988 | Traver et al. | 363/154 |
| 4,858,100 | 8/1989 | Tatara | 363/161 |
| 5,063,487 | 11/1991 | Johnson et al. | 363/3 |

Primary Examiner—A. D. Pellinen
Assistant Examiner—David Osborn
Attorney, Agent, or Firm—Bacon & Thomas

[57] ABSTRACT

A harmonic current filtering transformer includes a three-phase input winding and at least two wye-connected three-phase output windings. The output windings are phase shifted relative to each other by an amount which causes harmonic currents generated by a non-linear load to magnetically cancel in the transformer core.

25 Claims, 19 Drawing Sheets

| VECTOR | RELATIVE MAGNITUDE | PHASE ANGLE (degrees) |
|---|---|---|
| X4 | 1 | -15 |
| A | 0.8165 | 0 |
| X1 | 1 | +15 |
| X5 | 1 | +105 |
| B | 0.8165 | +120 |
| X2 | 1 | +135 |
| X6 | 1 | +225 |
| C | 0.8165 | +240 |
| X3 | 1 | +255 |
| A1 | 0.2989 | -60 |
| A2 | 0.2989 | +60 |
| B1 | 0.2989 | +60 |
| B2 | 0.2989 | +180 |
| C1 | 0.2989 | +180 |
| C2 | 0.2989 | -60 |

FIG. 7

| VECTOR | RELATIVE MAGNITUDE | PHASE ANGLE (degrees) |
|---|---|---|
| X4 | 1 | -15 |
| A | 0.8165 | 0 |
| X1 | 1 | +15 |
| X5 | 1 | +105 |
| B | 0.8165 | +120 |
| X2 | 1 | +135 |
| X6 | 1 | +225 |
| C | 0.8165 | +240 |
| X3 | 1 | +255 |
| A1 | 0.2989 | -60 |
| A2 | 0.2989 | +60 |
| B1 | 0.2989 | +60 |
| B2 | 0.2989 | +180 |
| C1 | 0.2989 | +180 |
| C2 | 0.2989 | -60 |
| X7 | 1 | -7.5 |
| X10 | 1 | +7.5 |
| X8 | 1 | +112.5 |
| X11 | 1 | +127.5 |
| X9 | 1 | +232.5 |
| X12 | 1 | +247.5 |
| $a_1$ | 0.9161 | +0 |
| $b_1$ | 0.9161 | +120 |
| $c_1$ | 0.9161 | +240 |
| A3 | 0.1507 | -60 |
| A4 | 0.1507 | +60 |
| B3 | 0.1507 | +60 |
| B4 | 0.1507 | +180 |
| C3 | 0.1507 | +180 |
| C4 | 0.1507 | -60 |

OUTPUT #1 = -15 ø SHIFT;
OUTPUT #2 = -45 ø SHIFT;

| HARMONIC | PHASE SEQ | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | VECTORIAL SUM REFLECTED TO INPUT | NORMALIZED VECTORIAL SUM REFLECTED TO INPUT | HARMONIC |
|---|---|---|---|---|---|---|---|---|
| 1 | + | -15 | -15 | -45 | -45 | 2.000 | 1 | 1 |
| 3 | 0 | ** | ** | ** | ** | 0.000 | 0 | 3 |
| 5 | - | -75 | -90 | -225 | -270 | 0.000 | 0 | 5 |
| 7 | + | 105 | -90 | 315 | -270 | 0.000 | 0 | 7 |
| 9 | 0 | ** | ** | ** | ** | 0.000 | 0 | 9 |
| 11 | - | -165 | -180 | -495 | -540 | 2.000 | 1 | 11 |
| 13 | + | 195 | -180 | 585 | -540 | 2.000 | 1 | 13 |
| 15 | 0 | ** | ** | ** | ** | 0.000 | 0 | 15 |
| 17 | - | -255 | -270 | -765 | -810 | 0.000 | 0 | 17 |
| 19 | + | 285 | -270 | 855 | -810 | 0.000 | 0 | 19 |
| 21 | 0 | ** | ** | ** | ** | 0.000 | 0 | 21 |
| 23 | - | -345 | -360 | -1035 | -1080 | 2.000 | 1 | 23 |
| 25 | + | 375 | -360 | 1125 | -1080 | 2.000 | 1 | 25 |
| 27 | 0 | ** | ** | ** | ** | 0.000 | 0 | 27 |
| 29 | - | -435 | -450 | -1305 | -1350 | 0.000 | 0 | 29 |
| 31 | + | 465 | -450 | 1395 | -1350 | 0.000 | 0 | 31 |
| 33 | 0 | ** | ** | ** | ** | 0.000 | 0 | 33 |
| 35 | - | -525 | -540 | -1575 | -1620 | 2.000 | 1 | 35 |
| 37 | + | 555 | -540 | 1665 | -1620 | 2.000 | 1 | 37 |
| 39 | 0 | ** | ** | ** | ** | 0.000 | 0 | 39 |
| 41 | - | -615 | -630 | -1845 | -1890 | 0.000 | 0 | 41 |
| 43 | + | 645 | -630 | 1935 | -1890 | 0.000 | 0 | 43 |
| 45 | 0 | ** | ** | ** | ** | 0.000 | 0 | 45 |
| 47 | - | -705 | -720 | -2115 | -2160 | 2.000 | 1 | 47 |
| 49 | + | 735 | -720 | 2205 | -2160 | 2.000 | 1 | 49 |
| 51 | 0 | ** | ** | ** | ** | 0.000 | 0 | 51 |
| 53 | - | -795 | -810 | -2385 | -2430 | 0.000 | 0 | 53 |
| 55 | + | 825 | -810 | 2475 | -2430 | 0.000 | 0 | 55 |

FIG. 8a

OUTPUT #1 =   0 ø SHIFT;
OUTPUT #2 =  30 ø SHIFT;

| HARMONIC | PHASE SEQUENCE | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | VECTORIAL SUM REFLECTED TO INPUT | NORMALIZED VECTORIAL SUM REFLECTED TO INPUT | HARMONIC |
|---|---|---|---|---|---|---|---|---|
| 1  | + | 0  | 0  | 30    | 30   | 2.000 | 1 | 1  |
| 3  | 0 | ** | ** | **    | **   | 0.000 | 0 | 3  |
| 5  | − | 0  | 0  | 150   | 180  | 0.000 | 0 | 5  |
| 7  | + | 0  | 0  | 210   | 180  | 0.000 | 0 | 7  |
| 9  | 0 | ** | ** | **    | **   | 0.000 | 0 | 9  |
| 11 | − | 0  | 0  | −330  | 360  | 2.000 | 1 | 11 |
| 13 | + | 0  | 0  | 390   | 360  | 2.000 | 1 | 13 |
| 15 | 0 | ** | ** | **    | **   | 0.000 | 0 | 15 |
| 17 | − | 0  | 0  | −510  | 540  | 0.000 | 0 | 17 |
| 19 | + | 0  | 0  | 570   | 540  | 0.000 | 0 | 19 |
| 21 | 0 | ** | ** | **    | **   | 0.000 | 0 | 21 |
| 23 | − | 0  | 0  | −690  | 720  | 2.000 | 1 | 23 |
| 25 | + | 0  | 0  | 750   | 720  | 2.000 | 1 | 25 |
| 27 | 0 | ** | ** | **    | **   | 0.000 | 0 | 27 |
| 29 | − | 0  | 0  | −870  | 900  | 0.000 | 0 | 29 |
| 31 | + | 0  | 0  | 930   | 900  | 0.000 | 0 | 31 |
| 33 | 0 | ** | ** | **    | **   | 0.000 | 0 | 33 |
| 35 | − | 0  | 0  | −1050 | 1080 | 2.000 | 1 | 35 |
| 37 | + | 0  | 0  | 1110  | 1080 | 2.000 | 1 | 37 |
| 39 | 0 | ** | ** | **    | **   | 0.000 | 0 | 39 |
| 41 | − | 0  | 0  | −1230 | 1260 | 0.000 | 0 | 41 |
| 43 | + | 0  | 0  | 1290  | 1260 | 0.000 | 0 | 43 |
| 45 | 0 | ** | ** | **    | **   | 0.000 | 0 | 45 |
| 47 | − | 0  | 0  | −1410 | 1440 | 2.000 | 1 | 47 |
| 49 | + | 0  | 0  | 1470  | 1440 | 2.000 | 1 | 49 |
| 51 | 0 | ** | ** | **    | **   | 0.000 | 0 | 51 |
| 53 | − | 0  | 0  | −1590 | 1620 | 0.000 | 0 | 53 |
| 55 | + | 0  | 0  | 1650  | 1620 | 0.000 | 0 | 55 |

FIG. 8b

| OUTPUT 1— | 15 °SHIFT; OUTPUT 4— | 60 °SHIFT |
| OUTPUT 2— | 30 °SHIFT; | |
| OUTPUT 3— | 45 °SHIFT; | |

| HARMONIC ORDER No. | PHASE MEASURE | OUTPUT #1 HARM INPUT PHASE SHIFT | OUTPUT #1 REFLECTED CURRENT SHIFT | OUTPUT #2 HARM INPUT PHASE SHIFT | OUTPUT #2 REFLECTED CURRENT SHIFT | OUTPUT #3 HARM INPUT PHASE SHIFT | OUTPUT #3 REFLECTED CURRENT SHIFT | OUTPUT #4 HARM INPUT PHASE SHIFT | OUTPUT #4 REFLECTED CURRENT SHIFT | VECTORIAL SUM REFLECTED INPUT | NORMALIZED VECTORIAL SUM REFLECTED INPUT | HARMONIC ORDER No. |
|---|---|---|---|---|---|---|---|---|---|---|---|---|
| 1 | + | -15 | 0 | -30 | 0 | -45 | 0 | -60 | 0 | 4.000 | 1 | 1 |
| 3 | – | ** | ** | ** | ** | ** | ** | ** | ** | 0.000 | 0 | 3 |
| 5 | + | 75 | 90 | 150 | 180 | 225 | 270 | 300 | 360 | 0.000 | 0 | 5 |
| 7 | – | -105 | 90 | 210 | 180 | -315 | 270 | -420 | 360 | 0.000 | 0 | 7 |
| 9 | + | ** | ** | ** | ** | ** | ** | ** | ** | 0.000 | 0 | 9 |
| 11 | – | 165 | 180 | -330 | 360 | 495 | 540 | 660 | 720 | 0.000 | 0 | 11 |
| 13 | + | -195 | 180 | 390 | 360 | -585 | 540 | -780 | 720 | 0.000 | 0 | 13 |
| 15 | – | ** | ** | ** | ** | ** | ** | ** | ** | 0.000 | 0 | 15 |
| 17 | + | 255 | 270 | -510 | 540 | 765 | 810 | 1020 | 1080 | 0.000 | 0 | 17 |
| 19 | – | -285 | 270 | 570 | 540 | -855 | 810 | -1140 | 1080 | 0.000 | 0 | 19 |
| 21 | + | ** | ** | ** | ** | ** | ** | ** | ** | 0.000 | 0 | 21 |
| 23 | – | 345 | 360 | -690 | 720 | 1035 | 1080 | 1380 | 1440 | 4.000 | 1 | 23 |
| 25 | + | -375 | 360 | 750 | 720 | -1125 | 1080 | -1500 | 1440 | 4.000 | 1 | 25 |
| 27 | – | ** | ** | ** | ** | ** | ** | ** | ** | 0.000 | 0 | 27 |
| 29 | + | 435 | 450 | -870 | 900 | 1305 | 1350 | 1740 | 1800 | 0.000 | 0 | 29 |
| 31 | – | -465 | 450 | 930 | 900 | -1395 | 1350 | -1860 | 1800 | 0.000 | 0 | 31 |
| 33 | + | ** | ** | ** | ** | ** | ** | ** | ** | 0.000 | 0 | 33 |
| 35 | – | 525 | 540 | -1050 | 1080 | 1575 | 1620 | 2100 | 2160 | 0.000 | 0 | 35 |
| 37 | + | -555 | 540 | 1110 | 1080 | -1665 | 1620 | -2220 | 2160 | 0.000 | 0 | 37 |
| 39 | – | ** | ** | ** | ** | ** | ** | ** | ** | 0.000 | 0 | 39 |
| 41 | + | 615 | 630 | -1230 | 1260 | 1845 | 1890 | 2460 | 2520 | 0.000 | 0 | 41 |
| 43 | – | -645 | 630 | 1290 | 1260 | -1935 | 1890 | -2580 | 2520 | 0.000 | 0 | 43 |
| 45 | + | ** | ** | ** | ** | ** | ** | ** | ** | 0.000 | 0 | 45 |
| 47 | – | 705 | 720 | -1410 | 1440 | 2115 | 2160 | 2820 | 2880 | 4.000 | 1 | 47 |
| 49 | + | -735 | 720 | 1470 | 1440 | -2205 | 2160 | -2940 | 2880 | 4.000 | 1 | 49 |
| 51 | – | ** | ** | ** | ** | ** | ** | ** | ** | 0.000 | 0 | 51 |
| 53 | + | 795 | 810 | -1590 | 1820 | 2385 | 2430 | 3180 | 3240 | 0.000 | 0 | 53 |
| 55 | – | -825 | 810 | 1650 | 1820 | -2475 | 2430 | -3300 | 3240 | 0.000 | 0 | 55 |

FIG. 10

```
OUTPUT #1 =    20  * SHIFT;
OUTPUT #2 =     0  * SHIFT;
OUTPUT #3 =   -20  * SHIFT;
```

| HARMONIC | PS HE AQ S E | OUTPUT #1 HARM PHASE SHIFT | REFLECTED INPUT CURRENT SHIFT | OUTPUT #2 HARM PHASE SHIFT | REFLECTED INPUT CURRENT SHIFT | OUTPUT #3 HARM PHASE SHIFT | REFLECTED INPUT CURRENT SHIFT | VECTORIAL SUM REFLECTED TO INPUT | NORMALIZED VECTORIAL SUM REFLECTED TO INPUT | HARMONIC |
|---|---|---|---|---|---|---|---|---|---|---|
| 1  | + | -20   | 20    | 0  | 0 | -20   | -20   | 3.000 | 1 | 1  |
| 3  | 0 | **    | **    | ** | ** | **   | **    | 0.000 | 0 | 3  |
| 5  | - | 100   | 120   | 0  | 0 | -100  | -120  | 0.000 | 0 | 5  |
| 7  | + | -140  | -120  | 0  | 0 | 140   | 120   | 0.000 | 0 | 7  |
| 9  | 0 | **    | **    | ** | ** | **   | **    | 0.000 | 0 | 9  |
| 11 | - | 220   | 240   | 0  | 0 | -220  | -240  | 0.000 | 0 | 11 |
| 13 | + | -260  | -240  | 0  | 0 | 260   | 240   | 0.000 | 0 | 13 |
| 15 | 0 | **    | **    | ** | ** | **   | **    | 0.000 | 0 | 15 |
| 17 | - | 340   | 360   | 0  | 0 | -340  | -360  | 3.000 | 1 | 17 |
| 19 | + | -380  | -360  | 0  | 0 | 380   | 360   | 3.000 | 1 | 19 |
| 21 | 0 | **    | **    | ** | ** | **   | **    | 0.000 | 0 | 21 |
| 23 | - | 460   | 480   | 0  | 0 | -460  | -480  | 0.000 | 0 | 23 |
| 25 | + | -500  | -480  | 0  | 0 | 500   | 480   | 0.000 | 0 | 25 |
| 27 | 0 | **    | **    | ** | ** | **   | **    | 0.000 | 0 | 27 |
| 29 | - | 580   | 600   | 0  | 0 | -580  | -600  | 0.000 | 0 | 29 |
| 31 | + | -620  | -600  | 0  | 0 | 620   | 600   | 0.000 | 0 | 31 |
| 33 | 0 | **    | **    | ** | ** | **   | **    | 0.000 | 0 | 33 |
| 35 | - | 700   | 720   | 0  | 0 | -700  | -720  | 3.000 | 1 | 35 |
| 37 | + | -740  | -720  | 0  | 0 | 740   | 720   | 3.000 | 1 | 37 |
| 39 | 0 | **    | **    | ** | ** | **   | **    | 0.000 | 0 | 39 |
| 41 | - | 820   | 840   | 0  | 0 | -820  | -840  | 0.000 | 0 | 41 |
| 43 | + | -860  | -840  | 0  | 0 | 860   | 840   | 0.000 | 0 | 43 |
| 45 | 0 | **    | **    | ** | ** | **   | **    | 0.000 | 0 | 45 |
| 47 | - | 940   | 960   | 0  | 0 | -940  | -960  | 0.000 | 0 | 47 |
| 49 | + | -980  | -960  | 0  | 0 | 980   | 960   | 0.000 | 0 | 49 |
| 51 | 0 | **    | **    | ** | ** | **   | **    | 0.000 | 0 | 51 |
| 53 | - | 1060  | 1080  | 0  | 0 | -1060 | -1080 | 3.000 | 1 | 53 |
| 55 | + | -1100 | -1080 | 0  | 0 | 1100  | 1080  | 3.000 | 1 | 55 |

FIG.11a

```
OUTPUT #1 =   20 ° SHIFT;
OUTPUT #2 =   40 ° SHIFT;
OUTPUT #3 =   60 ° SHIFT;
```

| HARMONIC | PHASE SEQUENCE | OUPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | OUTPUT #3 HARM PHASE SHIFT | OUTPUT #3 REFLECTED INPUT CURRENT SHIFT | VECTORIAL SUM REFLECTED TO INPUT | NORMALIZED VECTORIAL SUM REFLECTED TO INPUT | HARMONIC |
|---|---|---|---|---|---|---|---|---|---|---|
| 1  | + | -20   | 0    | 40    | 0    | 60    | 0    | 3.000 | 1 | 1  |
| 3  | 0 | **    | **   | **    | **   | **    | **   | 0.000 | 0 | 3  |
| 5  | - | 100   | 120  | 200   | 240  | 300   | 360  | 0.000 | 0 | 5  |
| 7  | + | -140  | 120  | 280   | 240  | -420  | 360  | 0.000 | 0 | 7  |
| 9  | 0 | **    | **   | **    | **   | **    | **   | 0.000 | 0 | 9  |
| 11 | - | 220   | 240  | -440  | 480  | 660   | 720  | 0.000 | 0 | 11 |
| 13 | + | -260  | 240  | 520   | 480  | -780  | 720  | 0.000 | 0 | 13 |
| 15 | 0 | **    | **   | **    | **   | **    | **   | 0.000 | 0 | 15 |
| 17 | - | 340   | 360  | -680  | 720  | 1020  | 1080 | 3.000 | 1 | 17 |
| 19 | + | -380  | 360  | 760   | 720  | -1140 | 1080 | 3.000 | 1 | 19 |
| 21 | 0 | **    | **   | **    | **   | **    | **   | 0.000 | 0 | 21 |
| 23 | - | 460   | 480  | -920  | 960  | 1380  | 1440 | 0.000 | 0 | 23 |
| 25 | + | -500  | 480  | 1000  | 960  | -1500 | 1440 | 0.000 | 0 | 25 |
| 27 | 0 | **    | **   | **    | **   | **    | **   | 0.000 | 0 | 27 |
| 29 | - | 580   | 600  | -1160 | 1200 | 1740  | 1800 | 0.000 | 0 | 29 |
| 31 | + | -620  | 600  | 1240  | 1200 | -1860 | 1800 | 0.000 | 0 | 31 |
| 33 | 0 | **    | **   | **    | **   | **    | **   | 0.000 | 0 | 33 |
| 35 | - | 700   | 720  | -1400 | 1440 | 2100  | 2160 | 3.000 | 1 | 35 |
| 37 | + | -740  | 720  | 1480  | 1440 | -2220 | 2160 | 3.000 | 1 | 37 |
| 39 | 0 | **    | **   | **    | **   | **    | **   | 0.000 | 0 | 39 |
| 41 | - | 820   | 840  | -1640 | 1680 | 2460  | 2520 | 0.000 | 0 | 41 |
| 43 | + | -860  | 840  | 1720  | 1680 | -2580 | 2520 | 0.000 | 0 | 43 |
| 45 | 0 | **    | **   | **    | **   | **    | **   | 0.000 | 0 | 45 |
| 47 | - | 940   | 960  | -1880 | 1920 | 2820  | 2880 | 0.000 | 0 | 47 |
| 49 | + | -980  | 960  | 1960  | 1920 | -2940 | 2880 | 0.000 | 0 | 49 |
| 51 | 0 | **    | **   | **    | **   | **    | **   | 0.000 | 0 | 51 |
| 53 | - | 1060  | 1080 | -2120 | 2160 | 3180  | 3240 | 3.000 | 1 | 53 |
| 55 | + | -1100 | 1080 | 2200  | 2160 | -3300 | 3240 | 3.000 | 1 | 55 |

FIG. 11b

OUTPUT #1 =    0 ø SHIFT;
OUTPUT #2 =   18 ø SHIFT;

| HARD MEMORIC HARMONIC | PHASE SEQUENCE | OUTPUT # 1 | | OUTPUT # 2 | | VECTORIAL SUM REFLECTED TO INPUT | NORMALIZED VECTORIAL SUM REFLECTED TO INPUT | HARD MEMORIC HARMONIC |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1  | + | 0  | 0  | 18   | 18  | 2.000 | 1.000 | 1  |
| 3  | 0 | ** | ** | **   | **  | 0.000 | 0.000 | 3  |
| 5  | − | 0  | 0  | 90   | 108 | 1.176 | 0.588 | 5  |
| 7  | + | 0  | 0  | 126  | 108 | 1.176 | 0.588 | 7  |
| 9  | 0 | ** | ** | **   | **  | 0.000 | 0.000 | 9  |
| 11 | − | 0  | 0  | −198 | 216 | 0.618 | 0.309 | 11 |
| 13 | + | 0  | 0  | 234  | 216 | 0.618 | 0.309 | 13 |
| 15 | 0 | ** | ** | **   | **  | 0.000 | 0.000 | 15 |
| 17 | − | 0  | 0  | −306 | 324 | 1.902 | 0.951 | 17 |
| 19 | + | 0  | 0  | 342  | 324 | 1.902 | 0.951 | 19 |
| 21 | 0 | ** | ** | **   | **  | 0.000 | 0.000 | 21 |
| 23 | − | 0  | 0  | −414 | 432 | 1.618 | 0.809 | 23 |
| 25 | + | 0  | 0  | 450  | 432 | 1.618 | 0.809 | 25 |
| 27 | 0 | ** | ** | **   | **  | 0.000 | 0.000 | 27 |
| 29 | − | 0  | 0  | −522 | 540 | 0.000 | 0.000 | 29 |
| 31 | + | 0  | 0  | 558  | 540 | 0.000 | 0.000 | 31 |
| 33 | 0 | ** | ** | **   | **  | 0.000 | 0.000 | 33 |
| 35 | − | 0  | 0  | −630 | 648 | 1.618 | 0.809 | 35 |
| 37 | + | 0  | 0  | 666  | 648 | 1.618 | 0.809 | 37 |
| 39 | 0 | ** | ** | **   | **  | 0.000 | 0.000 | 39 |
| 41 | − | 0  | 0  | −738 | 756 | 1.902 | 0.951 | 41 |
| 43 | + | 0  | 0  | 774  | 756 | 1.902 | 0.951 | 43 |
| 45 | 0 | ** | ** | **   | **  | 0.000 | 0.000 | 45 |
| 47 | − | 0  | 0  | −846 | 864 | 0.618 | 0.309 | 47 |
| 49 | + | 0  | 0  | 882  | 864 | 0.618 | 0.309 | 49 |
| 51 | 0 | ** | ** | **   | **  | 0.000 | 0.000 | 51 |
| 53 | − | 0  | 0  | −954 | 972 | 1.176 | 0.588 | 53 |
| 55 | + | 0  | 0  | 990  | 972 | 1.176 | 0.588 | 55 |

FIG. 12

OUTPUT #1 = -7.5 ø SHIFT;
OUTPUT #2 = -15 ø SHIFT;

| HARMONIC ORDER | PHASE SEQUENCE | OUTPUT #1 | | OUTPUT #2 | | VECTORIAL SUM REFLECTED TO INPUT | NORMALIZED VECTORIAL SUM REFLECTED TO INPUT | HARMONIC ORDER |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1  | + | -7.5   | -7.5  | -15  | -15  | 2.000 | 1.000 | 1  |
| 3  | 0 | **     | **    | **   | **   | 0.000 | 0.000 | 3  |
| 5  | - | -37.5  | -45   | -75  | -90  | 1.848 | 0.924 | 5  |
| 7  | + | 52.5   | -45   | 105  | -90  | 1.848 | 0.924 | 7  |
| 9  | 0 | **     | **    | **   | **   | 0.000 | 0.000 | 9  |
| 11 | - | -82.5  | -90   | -165 | -180 | 1.414 | 0.707 | 11 |
| 13 | + | 97.5   | -90   | 195  | -180 | 1.414 | 0.707 | 13 |
| 15 | 0 | **     | **    | **   | **   | 0.000 | 0.000 | 15 |
| 17 | - | -127.5 | -135  | -255 | -270 | 0.765 | 0.383 | 17 |
| 19 | + | 142.5  | -135  | 285  | -270 | 0.765 | 0.383 | 19 |
| 21 | 0 | **     | **    | **   | **   | 0.000 | 0.000 | 21 |
| 23 | - | -172.5 | -180  | -345 | -360 | 0.000 | 0.000 | 23 |
| 25 | + | 187.5  | -180  | 375  | -360 | 0.000 | 0.000 | 25 |
| 27 | 0 | **     | **    | **   | **   | 0.000 | 0.000 | 27 |
| 29 | - | -217.5 | -225  | -435 | -450 | 0.765 | 0.383 | 29 |
| 31 | + | 232.5  | -225  | 465  | -450 | 0.765 | 0.383 | 31 |
| 33 | 0 | **     | **    | **   | **   | 0.000 | 0.000 | 33 |
| 35 | - | -262.5 | -270  | -525 | -540 | 1.414 | 0.707 | 35 |
| 37 | + | 277.5  | -270  | 555  | -540 | 1.414 | 0.707 | 37 |
| 39 | 0 | **     | **    | **   | **   | 0.000 | 0.000 | 39 |
| 41 | - | -307.5 | -315  | -615 | -630 | 1.848 | 0.924 | 41 |
| 43 | + | 322.5  | -315  | 645  | -630 | 1.848 | 0.924 | 43 |
| 45 | 0 | **     | **    | **   | **   | 0.000 | 0.000 | 45 |
| 47 | - | -352.5 | -360  | -705 | -720 | 2.000 | 1.000 | 47 |
| 49 | + | 367.5  | -360  | 735  | -720 | 2.000 | 1.000 | 49 |
| 51 | 0 | **     | **    | **   | **   | 0.000 | 0.000 | 51 |
| 53 | - | -397.5 | -405  | -795 | -810 | 1.848 | 0.924 | 53 |
| 55 | + | 412.5  | -405  | 825  | -810 | 1.848 | 0.924 | 55 |

FIG. 13

```
OUTPUT #1 =    12 ø SHIFT;   OUTPUT #4    48  ø SHIFT
OUTPUT #2 =    24 ø SHIFT;   OUTPUT #5    60  ø SHIFT
OUTPUT #3 =    36 ø SHIFT;
```

| HARMONIC | PS HE AQ S E | OUTPUT #1 | | OUTPUT #2 | | OUTPUT #3 | |
|---|---|---|---|---|---|---|---|
| | | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT |
| 1  | + | −12   | 0   | −24   | 0    | −36   | 0 |
| 3  | 0 | ••    | ••  | ••    | ••   | ••    | •• |
| 5  | − | 60    | 72  | 120   | 144  | 180   | 216 |
| 7  | + | −84   | 72  | −168  | 144  | −252  | 216 |
| 9  | 0 | ••    | ••  | ••    | ••   | ••    | •• |
| 11 | − | 132   | 144 | 264   | 288  | 396   | 432 |
| 13 | + | −156  | 144 | −312  | 288  | −468  | 432 |
| 15 | 0 | ••    | ••  | ••    | ••   | ••    | •• |
| 17 | − | 204   | 216 | 408   | 432  | 612   | 648 |
| 19 | + | −228  | 216 | −456  | 432  | −684  | 648 |
| 21 | 0 | ••    | ••  | ••    | ••   | ••    | •• |
| 23 | − | 276   | 288 | 552   | 576  | 828   | 864 |
| 25 | + | −300  | 288 | −600  | 576  | −900  | 864 |
| 27 | 0 | ••    | ••  | ••    | ••   | ••    | •• |
| 29 | − | 348   | 360 | 696   | 720  | 1044  | 1080 |
| 31 | + | −372  | 360 | −744  | 720  | −1116 | 1080 |
| 33 | 0 | ••    | ••  | ••    | ••   | ••    | •• |
| 35 | − | 420   | 432 | 840   | 864  | 1260  | 1296 |
| 37 | + | −444  | 432 | −888  | 864  | −1332 | 1296 |
| 39 | 0 | ••    | ••  | ••    | ••   | ••    | •• |
| 41 | − | 492   | 504 | 984   | 1008 | 1476  | 1512 |
| 43 | + | −516  | 504 | −1032 | 1008 | −1548 | 1512 |
| 45 | 0 | ••    | ••  | ••    | ••   | ••    | •• |
| 47 | − | 564   | 576 | 1128  | 1152 | 1692  | 1728 |
| 49 | + | −588  | 576 | −1176 | 1152 | −1764 | 1728 |
| 51 | 0 | ••    | ••  | ••    | ••   | ••    | •• |
| 53 | − | 636   | 648 | 1272  | 1296 | 1908  | 1944 |
| 55 | + | −660  | 648 | −1320 | 1296 | −1980 | 1944 |

FIG. 14

| OUTPUT #4 | | OUTPUT #5 | | VECTORIAL SUM REFLECTED INPUT | NORMALIZED VECTORIAL SUM REFLECTED INPUT | HARMONIC |
|---|---|---|---|---|---|---|
| HARM PHASE SHIFT | REFLECTED INPUT CURRENT SHIFT | HARM PHASE SHIFT | REFLECTED INPUT CURRENT SHIFT | | | |
| −48 | 0 | −60 | 0 | 5.00 | 1 | 1 |
| " " | " " | " " | " " | 0.00 | 0 | 3 |
| 240 | 288 | 300 | 360 | 0.00 | 0 | 5 |
| −336 | 288 | −420 | 360 | 0.00 | 0 | 7 |
| " " | " " | " " | " " | 0.00 | 0 | 9 |
| 528 | 576 | 660 | 720 | 0.00 | 0 | 11 |
| −624 | 576 | −780 | 720 | 0.00 | 0 | 13 |
| " " | " " | " " | " " | 0.00 | 0 | 15 |
| 816 | 864 | 1020 | 1080 | 0.00 | 0 | 17 |
| −912 | 864 | −1140 | 1080 | 0.00 | 0 | 19 |
| " " | " " | " " | " " | 0.00 | 0 | 21 |
| 1104 | 1152 | 1380 | 1440 | 0.00 | 0 | 23 |
| −1200 | 1152 | −1500 | 1440 | 0.00 | 0 | 25 |
| " " | " " | " " | " " | 0.00 | 0 | 27 |
| 1392 | 1440 | 1740 | 1800 | 5.00 | 1 | 29 |
| −1488 | 1440 | −1860 | 1800 | 5.00 | 1 | 31 |
| " " | " " | " " | " " | 0.00 | 0 | 33 |
| 1680 | 1728 | 2100 | 2160 | 0.00 | 0 | 35 |
| −1776 | 1728 | −2220 | 2160 | 0.00 | 0 | 37 |
| " " | " " | " " | " " | 0.00 | 0 | 39 |
| 1968 | 2016 | 2460 | 2520 | 0.00 | 0 | 41 |
| −2064 | 2016 | −2580 | 2520 | 0.00 | 0 | 43 |
| " " | " " | " " | " " | 0.00 | 0 | 45 |
| 2256 | 2304 | 2820 | 2880 | 0.00 | 0 | 47 |
| −2352 | 2304 | −2940 | 2880 | 0.00 | 0 | 49 |
| " " | " " | " " | " " | 0.00 | 0 | 51 |
| 2544 | 2592 | 3180 | 3240 | 0.00 | 0 | 53 |
| −2640 | 2592 | −3300 | 3240 | 0.00 | 0 | 55 |

OUTPUT #1 = 10 ∅ SHIFT;  OUTPUT #4 = 40 ∅ SHIFT  
OUTPUT #2 = 20 ∅ SHIFT;  OUTPUT #5 = 50 ∅ SHIFT  
OUTPUT #3 = 30 ∅ SHIFT;  OUTPUT #6 = 60 ∅ SHIFT

| HARMONIC ORDER | SEQUENCE | OUTPUT — HARM PHASE SHIFT | OUTPUT — REFLECTED INPUT CURRENT SHIFT | OUTPUT — HARM PHASE SHIFT | OUTPUT — REFLECTED INPUT CURRENT SHIFT | OUTPUT — HARM PHASE SHIFT | OUTPUT — REFLECTED INPUT CURRENT SHIFT | OUTPUT — HARM PHASE SHIFT | OUTPUT — REFLECTED INPUT CURRENT SHIFT |
|---|---|---|---|---|---|---|---|---|---|
| 1 | + | −10 | 0 | −20 | 0 | −30 | 0 | −40 | 0 |
| 3 | 0 | 50 | 60 | 100 | 120 | 150 | 180 | 200 | 240 |
|   |   | −70 | 60 | −140 | 120 | −210 | 180 | −280 | 240 |
| 5 | − | 110 | 120 | 220 | 240 | 330 | 360 | 440 | 480 |
|   |   | −130 | 120 | −260 | 240 | −390 | 360 | −520 | 480 |
| 7 | + | 170 | 180 | 340 | 360 | 510 | 540 | 680 | 720 |
|   |   | −190 | 180 | −380 | 360 | −570 | 540 | −760 | 720 |
| 9 | 0 | 230 | 240 | 460 | 480 | 690 | 720 | 920 | 960 |
|   |   | −250 | 240 | −500 | 480 | −750 | 720 | −1000 | 960 |
| 11 | − | 290 | 300 | 580 | 600 | 870 | 900 | 1160 | 1200 |
|   |   | −310 | 300 | −620 | 600 | −930 | 900 | −1240 | 1200 |
| 13 | + | 350 | 360 | 700 | 720 | 1050 | 1080 | 1400 | 1440 |
|   |   | −370 | 360 | −740 | 720 | −1110 | 1080 | −1480 | 1440 |
| 15 | 0 | 410 | 420 | 820 | 840 | 1230 | 1260 | 1640 | 1680 |
|   |   | −430 | 420 | −860 | 840 | −1290 | 1260 | −1720 | 1680 |
| 17 | − | 470 | 480 | 940 | 960 | 1410 | 1440 | 1880 | 1920 |
|   |   | −490 | 480 | −980 | 960 | −1470 | 1440 | −1960 | 1920 |
| 19 | + | 530 | 540 | 1060 | 1080 | 1590 | 1620 | 2120 | 2160 |
|   |   | −550 | 540 | −1100 | 1080 | −1650 | 1620 | −2200 | 2160 |

| OUT PUT | | OUT PUT | | VECTORIAL SUM REFECTED INPUT | NORMONALIZ VECTORIAL SUM REFECTED INPUT | HARMONIC |
|---|---|---|---|---|---|---|
| HARM PHASE SHIFT | REFECTED INPUT CURRENT SHIFT | HARM PHASE SHIFT | REFECTED INPUT CURRENT SHIFT | | | |
| −50 | 0 | −60 | 0 | 6.000 | 1 | 1 |
| '' | '' | '' | '' | 0.000 | 0 | 3 |
| 250 | 300 | 300 | 360 | 0.000 | 0 | 5 |
| −350 | 300 | −420 | 360 | 0.000 | 0 | 7 |
| '' | '' | '' | '' | 0.000 | 0 | 9 |
| 550 | 600 | 660 | 720 | 0.000 | 0 | 11 |
| −650 | 600 | −780 | 720 | 0.000 | 0 | 13 |
| '' | '' | '' | '' | 0.000 | 0 | 15 |
| 850 | 900 | 1020 | 1080 | 0.000 | 0 | 17 |
| −950 | 900 | −1140 | 1080 | 0.000 | 0 | 19 |
| '' | '' | '' | '' | 0.000 | 0 | 21 |
| 1150 | 1200 | 1380 | 1440 | 0.000 | 0 | 23 |
| −1250 | 1200 | −1500 | 1440 | 0.000 | 0 | 25 |
| '' | '' | '' | '' | 0.000 | 0 | 27 |
| 1450 | 1500 | 1740 | 1800 | 0.000 | 0 | 29 |
| −1550 | 1500 | −1860 | 1800 | 0.000 | 0 | 31 |
| '' | '' | '' | '' | 0.000 | 0 | 33 |
| 1750 | 1800 | 2100 | 2160 | 6.000 | 1 | 35 |
| −1850 | 1800 | −2220 | 2160 | 6.000 | 1 | 37 |
| '' | '' | '' | '' | 0.000 | 0 | 39 |
| 2050 | 2100 | 2460 | 2520 | 0.000 | 0 | 41 |
| −2150 | 2100 | −2580 | 2520 | 0.000 | 0 | 43 |
| '' | '' | '' | '' | 0.000 | 0 | 45 |
| 2350 | 2400 | 2820 | 2880 | 0.000 | 0 | 47 |
| −2450 | 2400 | −2940 | 2880 | 0.000 | 0 | 49 |
| '' | '' | '' | '' | 0.000 | 0 | 51 |
| 2650 | 2700 | 3180 | 3240 | 0.000 | 0 | 53 |
| −2750 | 2700 | −3300 | 3240 | 0.000 | 0 | 55 |

| HARMONIC N-C | NORMALIZED OUTPUT USING A 2 WYE SECONDARY XFMR DA=30 DEG | NORMALIZED OUTPUT USING A 2 WYE SECONDARY XFMR DA=18 DEG | NORMALIZED OUTPUT USING A 3 WYE SECONDARY XFMR DA=20 DEG | NORMALIZED OUTPUT USING A 4 WYE SECONDARY XFMR DA=15 DEG | NORMALIZED OUTPUT USING A 5 WYE SECONDARY XFMR DA=12 DEG | NORMALIZED OUTPUT USING A 6 WYE SECONDARY XFMR DA=10 DEG | HARMONIC N-C |
|---|---|---|---|---|---|---|---|
| 1  | 1.000 | 1.000 | 1.000 | 1.000 | 1.000 | 1.000 | 1  |
| 3  | 0.000 | 0.000 | 0.000 | 0.000 | 0.000 | 0.000 | 3  |
| 5  | 0.000 | 0.588 | 0.000 | 0.000 | 0.000 | 0.000 | 5  |
| 7  | 0.000 | 0.588 | 0.000 | 0.000 | 0.000 | 0.000 | 7  |
| 9  | 0.000 | 0.000 | 0.000 | 0.000 | 0.000 | 0.000 | 9  |
| 11 | 1.000 | 0.309 | 0.000 | 0.000 | 0.000 | 0.000 | 11 |
| 13 | 1.000 | 0.309 | 0.000 | 0.000 | 0.000 | 0.000 | 13 |
| 15 | 0.000 | 0.000 | 0.000 | 0.000 | 0.000 | 0.000 | 15 |
| 17 | 0.000 | 0.951 | 0.000 | 0.000 | 0.000 | 0.000 | 17 |
| 19 | 0.000 | 0.951 | 0.000 | 0.000 | 0.000 | 0.000 | 19 |
| 21 | 0.000 | 0.000 | 0.000 | 0.000 | 0.000 | 0.000 | 21 |
| 23 | 1.000 | 0.809 | 1.000 | 1.000 | 1.000 | 1.000 | 23 |
| 25 | 1.000 | 0.809 | 1.000 | 1.000 | 1.000 | 1.000 | 25 |
| 27 | 0.000 | 0.000 | 0.000 | 0.000 | 0.000 | 0.000 | 27 |
| 29 | 0.000 | 0.000 | 0.000 | 0.000 | 0.000 | 0.000 | 29 |
| 31 | 0.000 | 0.000 | 0.000 | 0.000 | 0.000 | 0.000 | 31 |
| 33 | 0.000 | 0.809 | 0.000 | 0.000 | 0.000 | 0.000 | 33 |
| 35 | 1.000 | 0.809 | 1.000 | 0.000 | 0.000 | 0.000 | 35 |
| 37 | 1.000 | 0.000 | 1.000 | 0.000 | 1.000 | 1.000 | 37 |
| 39 | 0.000 | 0.951 | 0.000 | 0.000 | 0.000 | 0.000 | 39 |
| 41 | 0.000 | 0.951 | 0.000 | 0.000 | 0.000 | 0.000 | 41 |
| 43 | 0.000 | 0.000 | 0.000 | 0.000 | 0.000 | 0.000 | 43 |
| 45 | 0.000 | 0.309 | 0.000 | 0.000 | 0.000 | 0.000 | 45 |
| 47 | 1.000 | 0.309 | 1.000 | 1.000 | 0.000 | 0.000 | 47 |
| 49 | 1.000 | 0.000 | 1.000 | 1.000 | 0.000 | 0.000 | 49 |
| 51 | 0.000 | 0.000 | 0.000 | 0.000 | 0.000 | 0.000 | 51 |
| 53 | 0.000 | 0.588 | 1.000 | 0.000 | 0.000 | 0.000 | 53 |
| 55 | 0.000 | 0.588 | 1.000 | 0.000 | 0.000 | 0.000 | 55 | ns
TRANSFORMER WITH CANCELLATION OF HARMONIC CURRENTS BY PHASE SHITED SECONDARY WINDINGS

BACKGROUND OF THE INVENTION

1. Field of the Invention

The present invention relates to a polyphase voltage transformer which magnetically cancels harmonic currents caused by non-linear loads, and thereby reduces the harmonic current percentage present in the input line power distribution network.

2. Description of Related Art

Harmonic currents present in a power distribution network can present significant problems, including power losses, overheating, resonances and overvoltages, operational instability, and radio frequency disturbances. Any electronic circuit which presents a non-linear load to the power source will inherently generate harmonic currents. In many applications, for example at data processing and telecommunication sites, power distribution feeders may carry up to 80% harmonic currents. Power thyristors, rectifiers, and "switch mode" power supplies commonly used in data processing and telecommunications equipment are inherently non-linear and are a major cause of power supply degradation due to generation of harmonics.

A variety of systems have been proposed for on-site harmonic current reduction, including proposals involving use of multiple transformers or multi-phase transformers with delta coupled secondary windings. An example of the former, involving use of two single phase transformers having primary and secondary windings coupled in quadrature, together with "filtering" transformers between each of the taps, the filter transformers having a low impedance to desirable "phase equal" currents, is disclosed in U.S. Pat. No. 3,671,901. An example of the latter is disclosed in U.S. Pat. No. 4,779,189, which describes a system in which harmonics are essentially reduced by greatly increasing the number of phases at the output.

Such solutions have proved to be impractical for many applications because they are either overly complex and therefore costly, excessively bulky, or inefficient. In the case of a transformer with delta connected secondary windings, for example, a 30° phase shift can be used to delete some lower order harmonics, but this configuration can only be used to power very specific types of three phase loads. Since the delta connected secondary does not have a natural neutral, single phase loads and three-phase delta loads present problems. Most of the other known systems for reducing harmonics have similarly limited application.

In contrast, the present invention provides a harmonic suppression transformer in which all significant harmonic currents may be completely cancelled. This is accomplished using multiple wye-connected three-phase secondary outputs, and by phase shifting the outputs in such a way that the harmonics magnetically cancel each other in the transformer core and/or primary coils. As a result, a variety of load types may be accommodated.

While the technique of providing multiple three-phase wye connected outputs has previously been proposed, the technique has heretofore not been applied in a way which would suppress harmonics. Instead, the technique has been used for providing multiple outputs phase shifted in respect to each other by 180°, as disclosed in U.S. Pat. No. 2,470,598. The 180° phase shift arrangement does not have the effect of cancelling harmonics.

Because it has previously been thought necessary to provide delta connected secondary windings for harmonic suppression purposes, with or without the addition of additional tuning or filtering means such as the filtering transformers disclosed in U.S. Pat. No. 3,671,901, cited above, those skilled in the art have heretofore been unable to take advantage of the simplicity and compatibility advantages of a wye connection in applications requiring harmonic current suppression.

SUMMARY OF THE INVENTION

In view of the heretofore unresolved need for a system which provides complete harmonic current suppression and which is nevertheless applicable to a wide variety of load types, it is an objective of the invention to provide a transformer which filters harmonic currents by completely cancelling the harmonic currents, for any desired number of orders and for any fundamental frequency, and yet which uses simple wye-connected outputs and a standard delta connected input.

This objective of the invention is achieved by providing, according to a preferred embodiment of the invention, a transformer having multiple three-phase secondary output windings connected such that the windings are relatively phase-shifted to thereby prevent harmonic currents present in the output windings from being induced in the input winding, the magnetic flux vectors generated in the core by harmonic currents of selected orders adding to zero, or at least partially cancelling, for each respective selected order.

The magnitudes of the secondary output differential phase shifts required for cancellation are determined, according to the principles of the invention, by the distribution of the load harmonic currents, and the number of output windings. For example, for a three-phase two output transformer, constructed in accordance with a first embodiment of the invention, a relative secondary phase shift of 30° achieves complete cancellation of the fifth, seventh, seventeenth, and nineteenth harmonics. The eleventh and thirteenth harmonics are completely cancelled by a four output transformer having a relative phase shift of 15°, while triplens may be cancelled in either embodiment by a delta connected three wire primary. Additional embodiments of the invention can achieve total or partial cancellation of virtually any desired combination of harmonics, depending on the number of output windings and their relative phase shifts.

The preferred configuration has the advantage of requiring only a single core, thereby reducing the size and cost of the system (although multiple cores may be used if desired). Further, because the invention uses multiple wye secondaries, the system has the advantage that both single phase and of three-phase loads of various types can be powered safely.

BRIEF DESCRIPTION OF THE DRAWINGS

FIG. 7 is a table of relative magnitudes and phases for the vector diagram of FIG. 6.

FIG. 8(a) is a table illustrating the manner in which the preferred dual output transformer of FIG. 1 causes harmonic currents to be cancelled.

FIG. 8(b) is a table illustrating the effect of varying the primary to secondary phase angle in the transformer of FIG. 8(a).

FIG. 10 is a table illustrating the manner in which selected harmonic currents are cancelled by the transformer of FIG. 2.

FIG. 11(a) is a table illustrating the manner in which selected harmonic currents are cancelled by a transformer having three secondary windings relatively phase shifted by 20°.

FIG. 11(b) is a table illustrating the effect of varying the primary to secondary phase angle in the transformer of FIG. 11(a).

FIG. 12 is a table illustrating the manner in which selected harmonic currents are partially rather than completely cancelled by a transformer having two secondary windings relatively phase shifted by 18°.

FIG. 13 is a table illustrating the manner in which selected harmonic currents are partially cancelled by a transformer having two secondary windings relatively phase shifted by 7.5°.

FIG. 14 is a table illustrating the manner in which selected harmonic currents are completely cancelled by a five output transformer with a relative secondary phase shift 12°.

FIG. 15 is a table illustrating the manner in which selected harmonic currents are completely cancelled by a six output transformer with a relative secondary phase shift of 10°.

FIG. 16 is a table summarizing the harmonic orders completely or partially cancelled by the respective exemplary two through six output transformers shown in FIGS. 8(a), 12, 11(a), 10, 14 and 15.

DETAILED DESCRIPTION OF THE PREFERRED EMBODIMENTS

Figure 1:
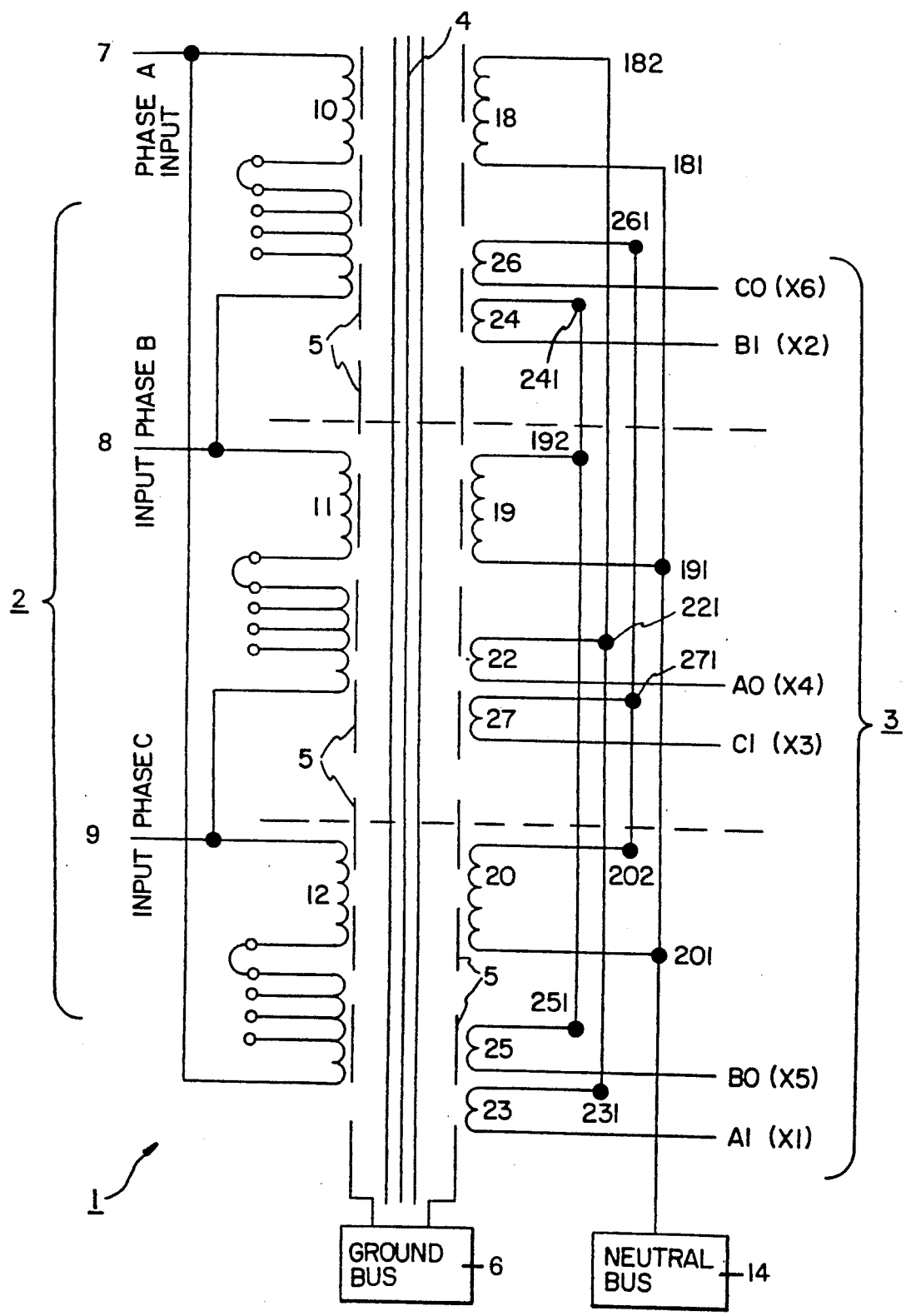
FIG. 1 is a schematic circuit diagram of a transformer having two wye-connected secondary output windings according to a preferred embodiment of the invention.

As shown in FIG. 1, a transformer 1 constructed according to a first preferred embodiment of the invention includes a three-phase primary input winding 2 and a three-phase secondary winding 3 made up of two three-phase secondary output windings. Transformer 1 also includes a core 4 and, optionally, shields 5 between the primary and secondary windings and the core, and connected to a common ground bus 6. The input winding, as is conventional, includes three input terminals 7–9 and three coils 10–12 preferably connected in delta configuration for each of the three phases A-C of the input, although the invention is not intended to be limited to any particular input winding configuration. The delta wound input has the advantage that "triplens", i.e., odd harmonic orders which are integer multiples of three, are cancelled by the delta input. Optionally, as illustrated, the output voltage for the two output three-phase transformer may be adjusted by adjusting the number of turns in each one of input coils 10–12 so as to match voltages and impedances.

It will be appreciated that FIG. 1 is schematic in nature and does not show the actual physical construction of the core and windings. In practice, the windings are wound around the core and may overlap each other, while the core may have a wide variety of configurations. For example, the core may be a single core, or it may be formed from multiple cores, although it is an advantage of the invention that a single core may be used if desired. In addition, the core may be made of steel, although other magnetic materials may also be used as core materials. The invention is directed not to the core structure per se but to the connections between the secondary windings, and implementation of the invention will be readily understood by those skilled in the art based on the following description of the secondary winding connections.

The secondary winding of the transformer includes two separate output windings each having a phase A terminal, a phase B terminal, and a phase C terminal. These terminals are designated, respectively, as terminals A0, B0 and C0 for the first winding and terminals A1, B1 and C1 for the second winding. All of the secondary outputs preferably have matched impedances and voltages on a line-to-line and line-to-neutral basis. In addition, all secondary three-phase outputs should have a double current neutral connection, provided by neutral bus 14. This double current neutral must be provided if zero sequence harmonics are present, as these harmonics add directly in the neutral.

Each of the secondary windings in this embodiment is made up of four coils, including output or vector coils 22–27 for the respective phase-shifted outputs and in-phase main secondary coils 18–20. The wye connections for the two secondary outputs are as follows:

Connected to the neutral bus 14 are respective first ends 181, 191, and 201 of each of main secondary coils 18–20 for the three phases. The wye connections are formed by connecting respective second ends 182, 192, and 202 of coils 18–20 to first ends 221, 231, 241, 251, 261, and 271 of the respective pairs 22 and 23, 24 and 25, and 26 and 27 of the secondary vector coils 22–27. The second ends of vector coils 22–27 are respectively connected to output terminals A0–C0 and A1–C1, as shown in FIG. 1.

Vector coils 22–27 are arranged so that the magnetic fluxes induced in the core 4 due to harmonic currents present at secondary outputs A0–C1 will oppose each other, and therefore not induce corresponding currents in the input winding.

Complete magnetic cancellation of current induced fluxes in the core is achieved by phase shifting the secondary winding outputs by 30° for the two output transformer of FIG. 1, and more generally by an amount equal to 60° divided by the number of outputs. This phase shift is a relative shift between the respective outputs of the secondary winding. However, under certain circumstances, it may also be desirable, as will be explained in connection with the embodiment illustrated in FIG. 11, to select a phase shift which does not completely cancel harmonics, but rather which partially cancels certain harmonics. The reason is that different harmonics have different magnitudes and it may be less important to cancel some than to cancel others.

On the other hand, the primary-to-secondary winding phase shift can have any desired value without affecting harmonic current cancellation, as will be apparent from the following discussion.

The actual phase shift between the multiple secondary windings is determined by three factors. These factors are the harmonic order, degree of cancellation, and the phase sequence. The primary to secondary phase shift $\theta$ is given by the formula $$\theta_h = A_0 \pm (h \times A_0) \quad (1)$$

where h is the harmonic order and $A_0$ is the phase shift primary-to-secondary. Whether the phase is $\pm$ in equation 1 depends on the phase sequence of the harmonic order. The negative ($-$) sign is used for negative sequence harmonics and the positive ($+$) sign is used for positive sequence harmonics.

The table in FIG. 8(a) indicates the phase sequence and primary to secondary phase shifts for each harmonic order of the two output transformer of FIG. 1. Column 1 gives the harmonic order and column 2 gives the phase sequence. Columns 3 and 6 give respective harmonic phase shifts for the first and second outputs. These phase shifts are equal to the second term in equation 1, i.e., $h \times A_0$. Columns 4 and 7 are the total reflected input current phase shift, obtained by adding the initial primary to secondary phase shift $A_0$ to the entry in respective columns 3 and 6. Finally, columns 5 and 8 are equivalent angles to the angles in columns 4 and 7, normalized to be between zero and 360 degrees for illustrative purposes. The sum of columns 4 and 7 or 8 and 9 is given in the last column of Table 1.

It is apparent from FIG. 8(a) that, although $A_0$ is illustratively set at 15° for the first output winding and at 45° for the second output winding the same results would be obtained for any pair of primary-to-secondary phase shifts, as long as the relative phase shift is 30°. For example, cancellation of harmonics would be equally effective for respective primary-to-secondary phase shifts of 0° and 30°, as shown in FIG. 8(b).

Multiples of the third harmonic order are cancelled out through use of the delta primary winding as noted above. Thus, their values are replaced in the tables by double asterisks. However, in the embodiments shown in FIGS. 8(a) and 8(b), harmonics 11 and 13, 23 and 25, and 35 and 37 are seen to be in the same direction for both outputs and therefore do not cancel.

On the other hand, by simply adding two more secondary windings, relatively phase shifted by 15° as shown in FIG. 10, the 11th, 13th, 35th and 37th orders can be cancelled, and by adding six more windings, all of the first 45 harmonics, at least, may be cancelled. FIGS. 11(a) and 14–15 respectively illustrate the results obtained by three, five, and six output transformers in which the outputs are relatively phase shifted by 60° divided by the number of outputs, for complete cancellation of selected harmonic orders. FIG. 11(b) shows a three output transformer similar to that of FIG. 11(a), but with a shifted primary to secondary phase difference.

Figure 2:
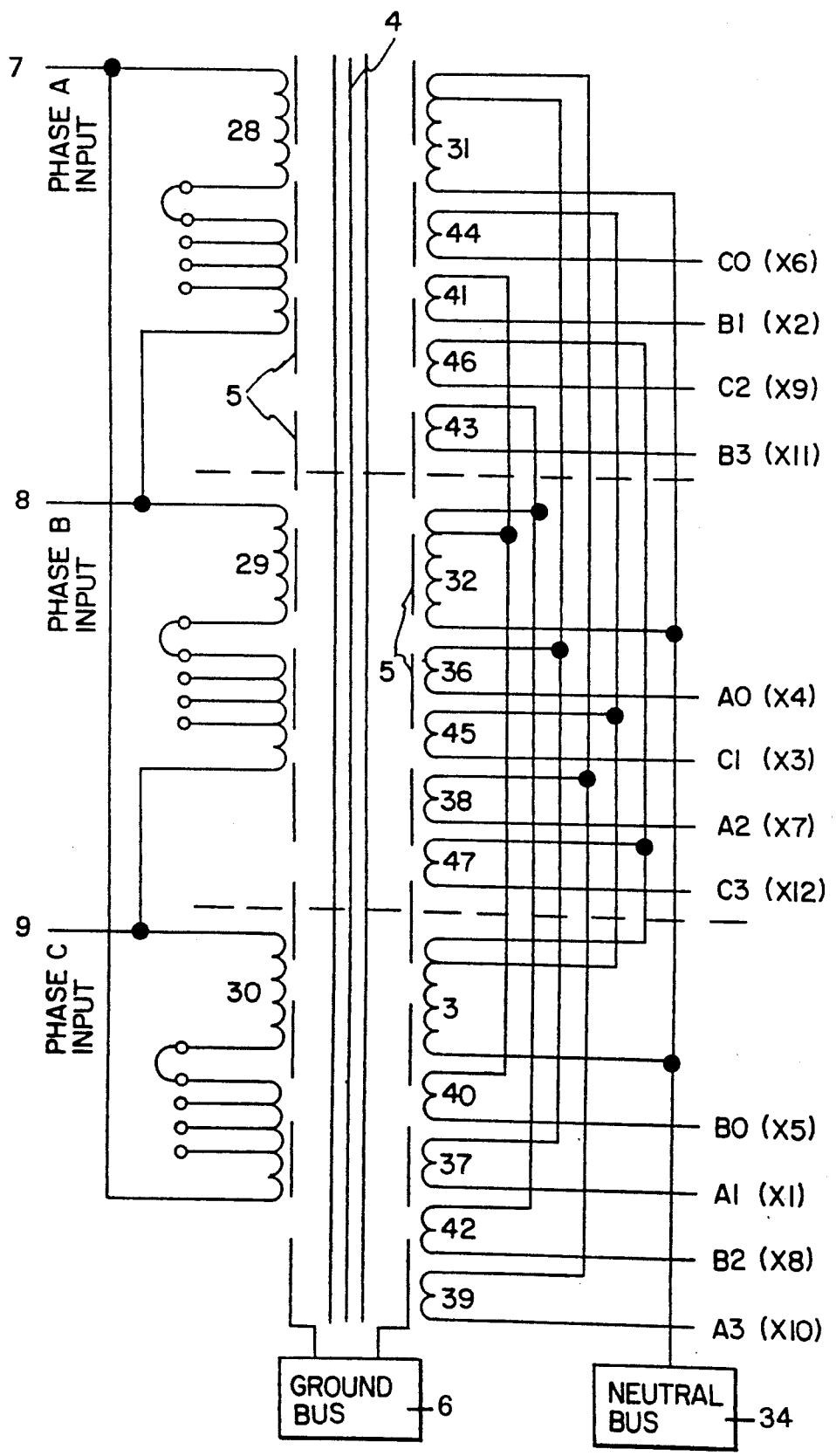
FIG. 2 is a schematic circuit diagram of a transformer having four wye-connected secondary output windings according to another preferred embodiment of the invention.

The wiring for the four output winding version is shown in FIG. 2, and the operation thereof is illustrated by the table of FIG. 10. In this version, the relative phase shift between outputs is 15°, such that output No. 1 is at 15°, output No. 2 is at 30°, output No. 3 is at 45°, and output No. 4 is at 60°. Thus, for the 11th harmonic, there are four outputs at, respectively, $-180°$, $+180°$, $-180°$, and $+180°$, and thus the outputs cancel.

Optionally, as illustrated, the output voltage for the four output three-phase transformer may be adjusted by adjusting the number of turns in each one of input coils 28–30 so as to match voltages and impedances, so that the four output transformer uses the same delta connected input as the two output transformer. Again, three main secondary coils 31–33 are connected at one end to a neutral bus 34, and wye-connected at second ends, via vector coils 36–47, to the respective phase outputs A0–A3, B0–B3, and C0–C3. For simplicity, the ends of the respective coils are not numbered in FIG. 2.

Figures 4, 5:
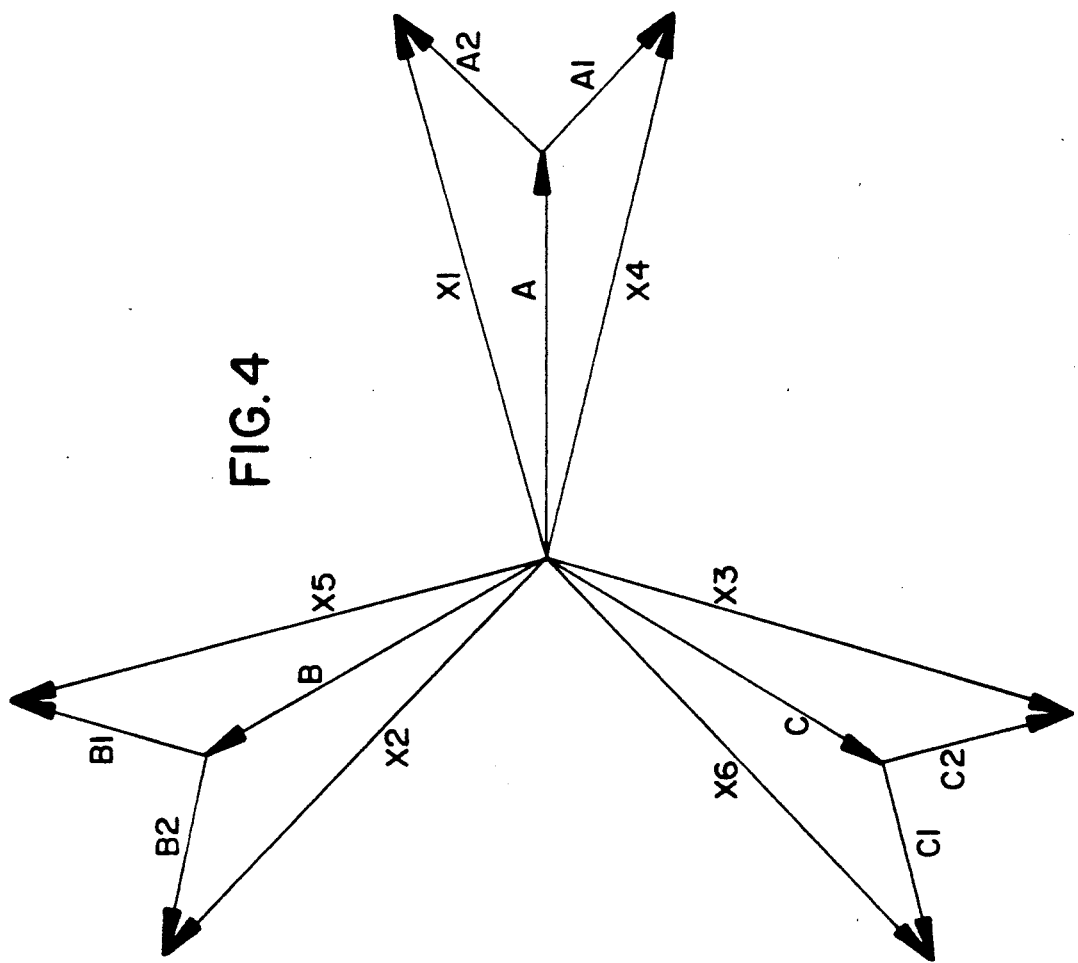
FIG. 4 is a vector diagram showing the relationship of the secondary winding phasors for the preferred dual output transformer of FIG. 1.
FIG. 5 is a table of relative magnitudes and phases for the vector diagram of FIG. 4.
Figure 6:
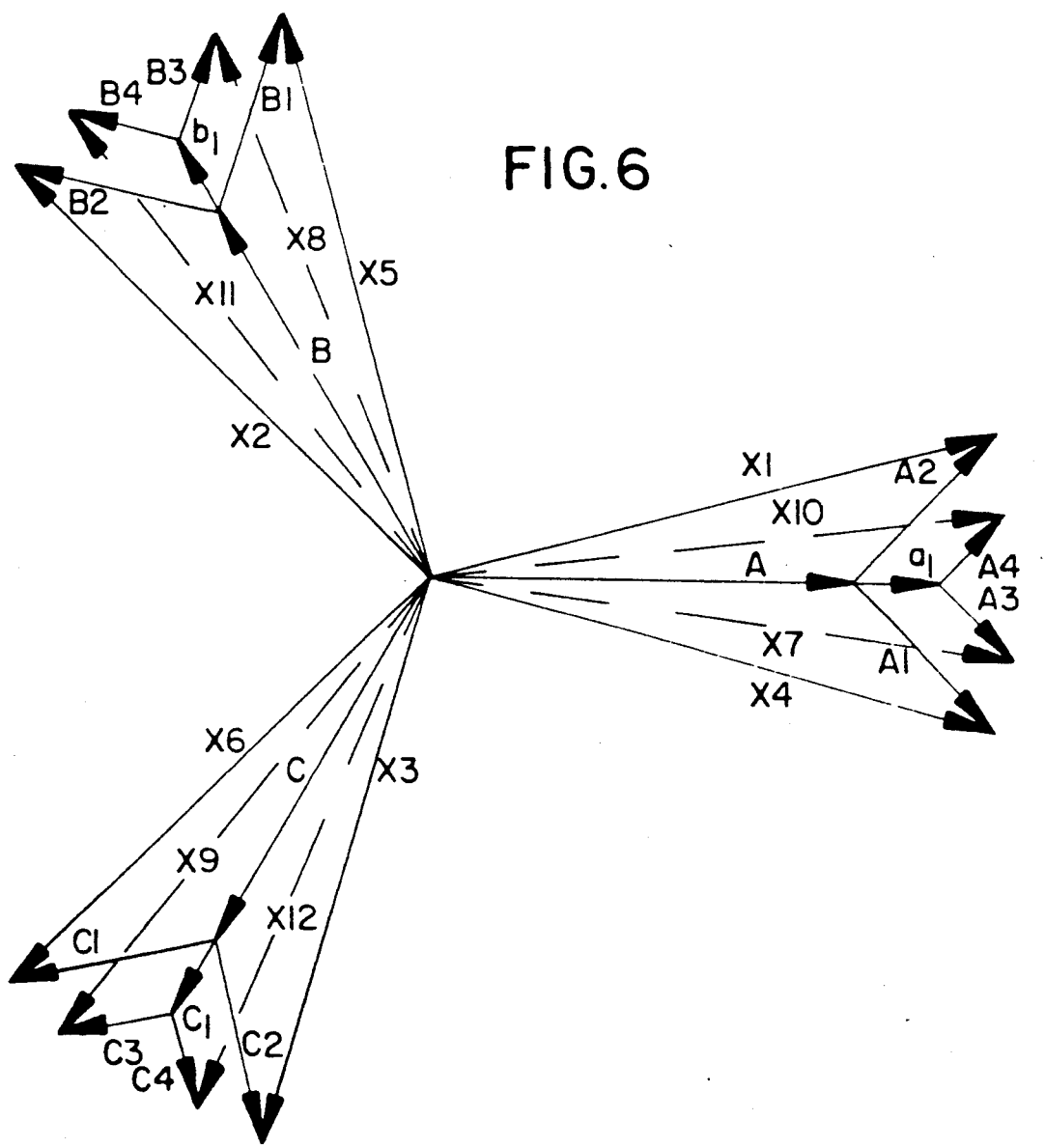
FIG. 6 is a vector diagram showing the relationship of the secondary winding phasors for the four output transformer of FIG. 2.

The operation of the invention can be further understood in reference to the vector or phasor diagrams of FIGS. 4–7. FIG. 4 shows current vectors for the coupling of the primary windings (vectors A, B, and C) and secondary windings (vectors X1–X6) of the two output transformer of FIG. 1. As is apparent from FIG. 4, with output phase A set at zero degrees, and pairs $(X_1,X_4)$, $(X_2,X_5)$, and $(X_3,X_6)$ at relative phase shifts of 30°, difference vectors A1, A2, B1, B2, C1 and C3 add to zero or 360°. The actual relative magnitudes and phase angles for the respective vectors are shown in FIG. 5. In the four output example of FIGS. 6 and 7, similar cancellation is obtained. In order for the difference vectors A3, A4, B3, B4, C3, and C4 to add to 360°, those skilled in the art will appreciate that, as indicated by the phaser diagram in FIG. 6 which shows contributions of the various coils in FIG. 2, the vectors A, B and C resulting from secondary coils 31–33 are required to include extensions a', b', and c', which are obtained by tapping the main coils in an appropriate manner as shown.

Figure 3:
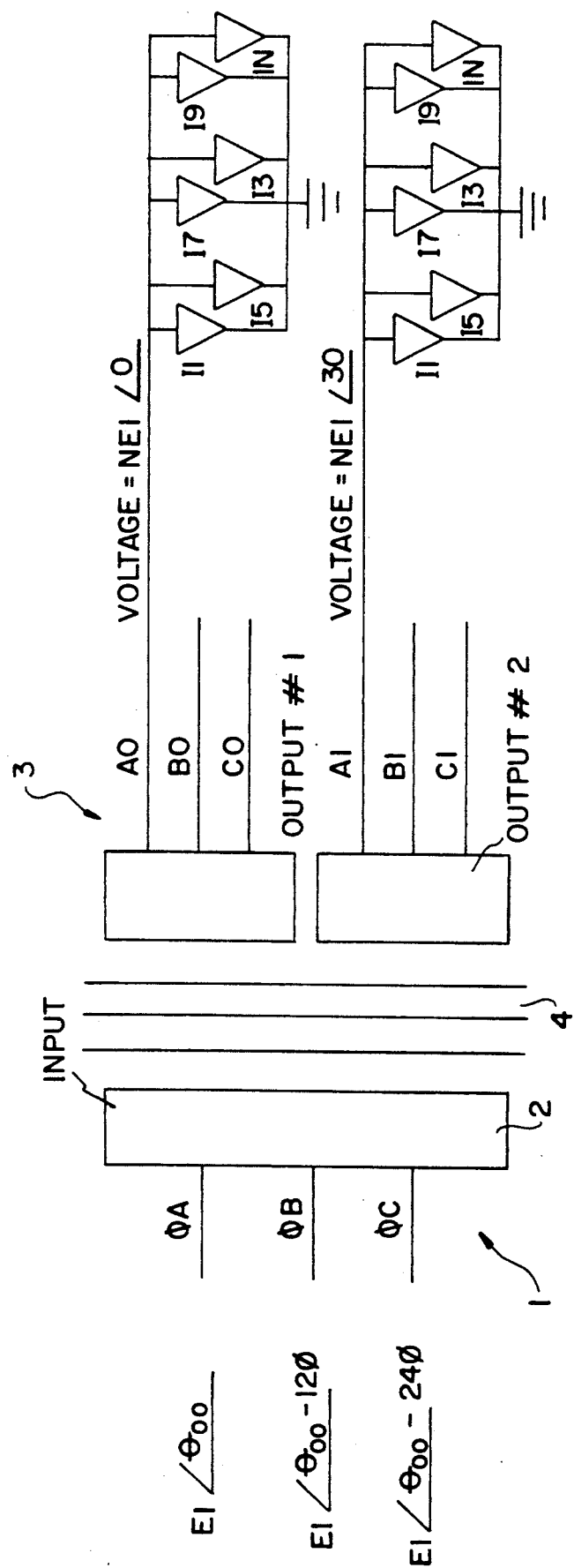
FIG. 3 is an equivalent circuit diagram for the preferred dual output transformer of FIG. 1.

The relationship between voltages and current is shown in FIG. 3, which is equivalent to FIG. 1 but includes a non-linear current load. The input voltages are given by E1, and the two output voltages by NE1, where N is the input-to-output turns ratio. I, I5, ... IN correspond to all possible odd harmonic currents that can be generated in an AC system. I1 is the fundamental current. Output #1 phase A is the reference phase and is assigned a phase shift of zero, which is in phase with fundamental current I1.

Figure 9A:
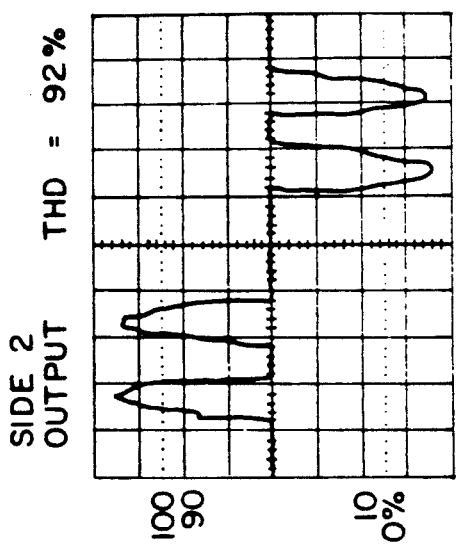
FIGS. 9(a), 9(b), and 9(c) are oscilloscope plots showing the input and outputs for the transformer of FIG. 1 when connected to a non-linear load which causes a total harmonic distortion of greater than 80% in the signal present at the outputs of the transformer.
Figure 9B:
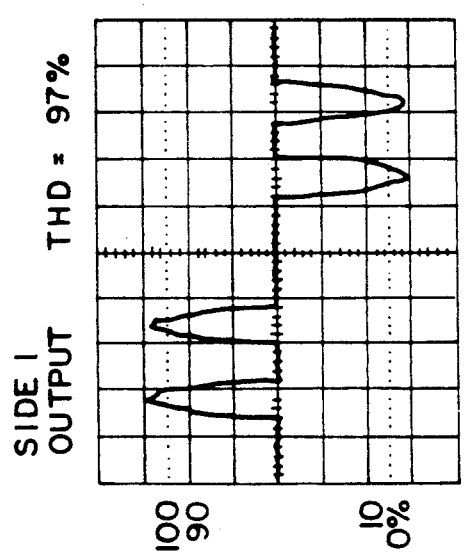
Figure 9C:
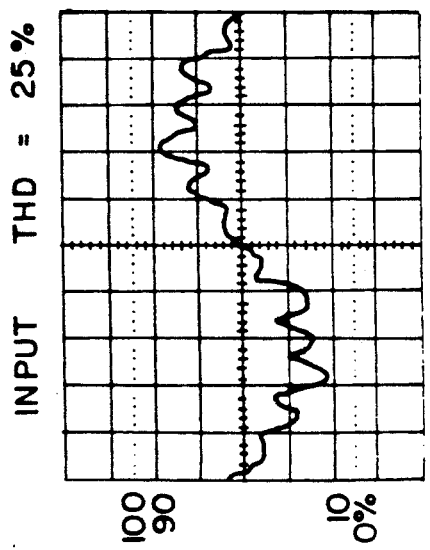

An oscilloscope plot of the arrangement of FIG. 3 is shown in FIGS. 9(a)–9(c). FIG. 9(a) is a plot of the input side current, while FIGS. 9(b) and 9(c) are plots of the two output side currents connected to loads causing total harmonic distortions (THD) of 97% and 92% respectively. The input side THD is reduced to 25%, a dramatic improvement.

Under certain circumstances, it may also be advantageous to vary the relative phase shifts by amounts other than those described above, i.e., by amounts other than 60° divided by the number of outputs. The result is partial cancellation of selected orders. For example, partial cancellation of the 5th, 7th, 11th, 13th, 15th, and 17th harmonics can be achieved in a two output transformer with a differential secondary phase shift of 18°, as shown in FIG. 12, while different magnitudes of partial cancellation can be achieved by a transformer having two wye connected secondary outputs relatively phase shifted by 7.5°, as shown in FIG. 13.

As is apparent from FIG. 12, by settling for a 50% reduction in the 5th and 7th harmonics, one obtains a 70% reduction in the 11th and 13th harmonics. The fifth and seventh harmonics are not reduced at all in the two output, 30° embodiment of FIG. 8(a). Because the magnitudes of the various harmonic orders may vary with different loads, it is possible that under certain circumstances, the embodiments of FIGS. 12 and 13 may actually be preferable to that of FIGS. 8(a) or 8(b).

The normalized outputs for the embodiments of FIGS. 8(a), 10, 11(a), 14 and 15, as well as that of FIG. 12, are summarized in the table of FIG. 14. It is apparent from FIG. 14 that, by simply increasing the number of outputs, and relatively phase shifting them by 60° divided by the number of outputs, any number of selected harmonics can be caused to completely cancel. Furthermore, FIG. 14 shows the advantages of incomplete cancellation, in the case of the two wye, 18° embodiment, which at least partially cancels a greater number of harmonics than does the two wye 30° embodiment.

Having thus described several specifically preferred embodiments of the invention, it will nevertheless be appreciated that numerous other variations are possible. For example, those skilled in the art will appreciate that the invention may easily be adapted to encompass multiple output transformers having more than six or eight three phase wye connected secondary outputs, so long as the outputs are phase shifted to prevent harmonic currents from appearing at the primary winding inputs. This concept may further be adapted to multiple phase transformers other than three-phase transformers. The higher the number of secondaries, the higher the number of harmonic orders that can be cancelled.

A few of the alternative configurations which are intended to be included within the scope of the invention are:

1. Two or more separate transformers may be provided with single or multiple phase shifted secondaries. The harmonic cancellation occurs at the point where the primary feeders are paralleled. The transformers can also be connected in series to cancel harmonics.

2. Two or more transformers having only the main secondary winding, the vector windings being contained in separate auto or isolation transformers.

3. An autotransformer with main and vector coils, in a delta or wye configuration. This configuration will not cancel triplen harmonics.

Thus, it will be appreciated that the phase shifts and number of secondary windings can be varied as desired depending on the number of harmonic pairs and the degree of attenuation required for the harmonic pairs as noted above.

It is therefore intended that the above description not be construed as limiting, but rather than the invention be defined solely by the appended claims.

I claim:

1. A transformer, comprising:
   at least one transformer core;
   a three-phase primary input winding; and
   at least two three-phase wye-connected output windings,
   wherein said output windings are phase-shifted relative to each other to cause magnetic flux vectors generated in said core by harmonic currents present in the output windings to add to zero for respective orders of selected harmonic currents and thereby prevent the selected harmonic currents present in the output windings from being induced in said input windings.

2. A transformer as claimed in claim 1, wherein said harmonic currents for which said magnetic flux vectors add to zero include at least harmonic currents of the first, fifth and seventh orders.

3. A transformer as claimed in claim 2, wherein said harmonic currents for which said magnetic flux vectors add to zero further include harmonic currents of the 11th and 13th orders.

4. A transformer as claimed in claim 2, wherein said input winding is a three-phase delta-connected input winding and all triplens are thereby cancelled due to the delta connection.

5. A transformer as claimed in claim 1, wherein said output windings comprise two three-phase wye-connected output windings, said two output windings having a relative phase shift of 30°.

6. A transformer as claimed in claim 1, wherein said output windings comprise four three-phase output windings, said four output windings having a relative phase shift of 15°.

7. A transformer as claimed in claim 1, wherein each of said output windings is a wye-connected output winding connected to a full or double current neutral.

8. A transformer as claimed in claim 7, wherein said output windings are connected to three output terminals for each of said output windings, a first end of an in-phase main secondary coil being directly connected to the neutral bus, a second end of said main secondary coil being connected to a first end of each of at least two output coils, and a second end of each of said at least two output coils being connected to one of said terminals.

9. A transformer as claimed in claim 8, comprising 12 of said output terminals and four of said three-phase output windings.

10. A transformer as claimed in claim 8, wherein at least three of said output terminals are connected to a non-linear load.

11. A transformer as claimed in claim 1, wherein at least one of said output windings is connected to a non-linear load.

12. A transformer as claimed in claim 11, wherein said input winding is connected to a power distribution network, whereby harmonic currents generated by said non-linear load are filtered by cancellation at said transformer and thereby prevented from being passed through to said power distribution network.

13. A transformer as claimed in claim 1, wherein the relative phase shift between said output windings is equal to 60° divided by the number of said output windings.

14. A transformer as claimed in claim 1, wherein said output windings comprise three three-phase output windings, said three output windings having a relative phase shift of 20°.

15. A transformer as claimed in claim 1, wherein said output windings comprise five three-phase output windings, said five output windings having a relative phase shift of 12°.

16. A transformer as claimed in claim 1, wherein said output windings comprise six three-phase output windings, said six output windings having a relative phase shift of 10°.

17. A transformer, comprising:
   at least one transformer core;
   a three-phase primary input winding; and
   at least two three-phase wye-connected output windings,
   wherein said output windings are phase-shifted relative to each other to cause magnetic flux vectors generated in said core by harmonic currents present in the output windings to partially cancel for respective orders of selected harmonic currents to thereby prevent the selected harmonic currents present in the output windings from being induced in said input windings.

18. A transformer as claimed in claim 17, wherein said input winding is a three-phase delta-connected input winding and all triplens are thereby cancelled due to the delta connection.

19. A transformer as claimed in claim 17, wherein said output windings comprise two three-phase wye-connected output windings, said two output windings having a relative phase shift of 18°.

20. A transformer as claimed in claim 17, wherein said output windings comprise two three-phase wye-connected output windings, said two output windings having a relative phase shift of 7.5°.

21. A transformer as claimed in claim 17, wherein each of said output windings is a wye-connected output winding connected to a full or double current neutral.

22. A transformer as claimed in claim 21, wherein said output windings are connected to three output terminals for each of said output windings, a first end of an in-phase main secondary coil being directly connected to the neutral bus, a second end of said main secondary coil being connected to a first end of each of at least two output coils, and a second end of each of said at least two output coils being connected to one of said terminals.

23. A transformer as claimed in claim 22, wherein at least three of said output terminals are connected to a non-linear load.

24. A transformer as claimed in claim 17, wherein at least one of said output windings is connected to a non-linear load.

25. A transformer as claimed in claim 24, wherein said input winding is connected to a power distribution network, whereby harmonic currents generated by said non-linear load are filtered by partial cancellation at said transformer and thereby prevented from being passed through to said power distribution network.

* * * * *

UNITED STATES PATENT AND TRADEMARK OFFICE
CERTIFICATE OF CORRECTION

PATENT NO. : 5,206,539
DATED : April 27, 1993
INVENTOR(S) : John B. Kammeter

It is certified that error appears in the above-identified patent and that said Letters Patent is hereby corrected as shown below:

On the title page, item (54), and column 1 line 2.

In the title, change "SHITED" to —SHIFTED—.

Signed and Sealed this

First Day of February, 1994

Attest:

BRUCE LEHMAN

Attesting Officer     Commissioner of Patents and Trademarks